(12) United States Patent
Polanyi et al.

(10) Patent No.: US 7,092,872 B2
(45) Date of Patent: Aug. 15, 2006

(54) SYSTEMS AND METHODS FOR GENERATING ANALYTIC SUMMARIES

(75) Inventors: Livia Polanyi, Palo Alto, CA (US); Martin Henk Van Den Berg, Palo Alto, CA (US)

(73) Assignee: Fuji Xerox Co., Ltd., Tokyo (JP)

( * ) Notice: Subject to any disclaimer, the term of this patent is extended or adjusted under 35 U.S.C. 154(b) by 1027 days.

(21) Appl. No.: 09/883,345

(22) Filed: Jun. 19, 2001

(65) Prior Publication Data

US 2002/0194230 A1    Dec. 19, 2002

(51) Int. Cl.
  *G06F 17/27* (2006.01)
(52) U.S. Cl. .......................... 704/9; 715/534
(58) Field of Classification Search .............. 704/9; 715/534
  See application file for complete search history.

(56) References Cited

U.S. PATENT DOCUMENTS

| | | | | |
|---|---|---|---|---|
| 5,077,668 A | * | 12/1991 | Doi | 715/531 |
| 5,918,240 A | * | 6/1999 | Kupiec et al. | 715/531 |
| 5,924,108 A | * | 7/1999 | Fein et al. | 715/531 |
| 5,978,820 A | * | 11/1999 | Mase et al. | 715/531 |
| 6,289,304 B1 | * | 9/2001 | Grefenstette | 704/9 |

OTHER PUBLICATIONS

U.S. Appl. No. 09/689,779, filed Oct. 13, 2000, Polanyi et al.
Producing Intelligent Telegraphic Text Production to provide an Audio Scanning Service for the Blind in Intelligent Text Summarization, Grefenstette, G., OAAAI Spring Symposium Series, Stamford, CA 1998, p. 111-117.
Text compaction for display on very small screens, Corston-Oliver, S. in North American Chapter of the Association for Computational Linguist (NAACL) 2001 Language Technologies Workshops, Jun. 3-4, 2001.
PERL. Squeeze Module Manual Page., Revision Dated Dec. 4, 1998.

* cited by examiner

*Primary Examiner*—Richemond Dorvil
*Assistant Examiner*—Lamont Spooner
(74) *Attorney, Agent, or Firm*—Sughrue Mion, PLLC; Pavel Pogodin, Esq.

(57) ABSTRACT

A technique for compressing texts such that referential integrity, sentence coherency, punctuation and readability are preserved and which provides for compression of sentence constituents based on the type of content, the informativity of the sentence constituent and the grammatical readability of the resultant sentence or phrase. Information content portions are parsed to generate parts of speech tags. The informativity of the constituents in a phrase or sentence is determined and the parts of speech having lower information content and having a low effect on grammatical readability of the phrase or sentence are selectively compressed. Parts of speech having successively higher informativity and low effect on grammatical readability are selected for compression until the desired level of compression is reached. Compressed portions are indicated in the summary with a selectable placeholder which expands to display the compressed text.

14 Claims, 13 Drawing Sheets

John ate the donuts in the kitchen near the window at 4 pm on Sunday. The big stale glazed donuts were in the waxed half-torn white bag. He eats the sugary confections during dinner every day during his vacations. It might be the case that he will gain weight.

Fig. 6

John ate the donuts in the kitchen <near the window at 4 pm> on Sunday. The big <stale> glazed donuts were in the waxed <half-torn> white bag. He eats the sugary confections <during dinner every day> during his vacations. <It might be the case that> he <will> might gain weight.

Fig. 7

John ate the donuts in the kitchen ... on Sunday. The big ... glazed donuts were in the waxed ... white bag. He eats the sugary confections ... during his vacations. ... he ...might gain weight.

Fig. 8

John ate the donuts in the kitchen ... on Sunday. The big ... glazed donuts were in the waxed ... white bag. He eats the sugary confections <during dinner every day> during his vacations. ... he ...might gain weight.

Fig. 9

John ate the donuts in the kitchen on Sunday. The big glazed donuts were in the waxed white bag. He eats the sugary confections during his vacations. he might gain weight.

Fig. 10

1) *He ate the donuts in the kitchen ~~near the window at 4 pm~~ on Sunday.*

Dutch
Hij at de donuts    in de keuken    op zondag ~~om 4 uur~~    ~~vlakbij hot raam~~.
He ate the donuts  in the kitchen  on Sunday at 4 o'clock   near window

German
Er ass die donuts  ~~am Fenster~~  in der kueche am Sonntag ~~um 16 h~~.
He ate the donuts  near window  in the kitchen on Sunday   at 4

French
Dimanche ~~à 4 heures~~, il a mangé les beignets dans la cuisine, ~~à côté de la fenêtre~~.
Sunday    4 o'clock    He ate    the donut   in the kitchen    near the window

Chinese
Xīng Qí Tiān ~~Xià Sí Diǎn~~    , Tā Zài   Chú Fáng ~~Chuāng Biān~~   Chī Diàn Xīn
Sunday         pm   4 o'clock  He locate kitchen   window near   eat donut

Japanese
KARE HA NITIYOUBI~~NO COCO 4 JI~~ NI DAIDOKORO ~~NO MADO NO SOBADE~~ DONUTS WO TABEMASITA
He         Sunday     on pm 4    at the kitchen   on the window near   the donuts ate

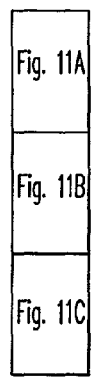

2) *The big old green boat floated in the cold murky dirty water.*

Dutch
De grote ~~eude~~ groene boot  dreef  in het vieze ~~keude~~ troebele water.
The big    old  green  boat floated in the dirty  cold   murky   water.

German
Das grosse, ~~alte~~, gruene Boot schwamm im kalten, ~~trueben~~, dreckigen Wasser.
The big      old   green  boat floated    in cold    murky    dirty    water.

French
Le grand et ~~vieux~~ bateau vert  beignait dans une eau  froide, sale  at boueuse.
The big and old   boat  green  floated  in   a water cold   dirty and murky.

Chinese
Zhè  Tiáo Jiu Dè ~~Lù Sè Dè~~ Dà Chuán Yǐ Chián Biāo Zài Wū  ~~Zhuè Dè~~ Lěng Shuǐ Li.
This old        green       big boat   was      float in dirty dark    cold water in

Japanese
MIDORI-IRO NO ~~PURUI~~ OOKINA BOAT GA TUMETAKUTE USUYOGORETA KAWANI  UKANDEIMASITA
Green              old   big   the boat  cold       murky-dirty  the water   floated in

Fig. 11A

3) *Dad takes a brisk walk before breakfast every day during the summer.*
Dutch
In de zomer   makt vader ~~elke dag~~ een gezonde wandeling ~~veer het entbijt~~.
In the summer takes father every day  a  healthy   walk      before the breakfast
or (after seeing the German)
Vader maakt in de zomer   ~~elke dag~~ een gezonde wandeling ~~veer het ontbijt~~.
Father take  in the summer every day a healthy walk         before the breakfast

German
Vater macht ~~jeden Tag~~ im Sommer    einen strammen Spaziergang ~~ver dem Fruebetueck~~.
Father take every day in the summer   a brisk walk                 before the breakfast

French
~~Chaque jour~~ pendant l'été,  Papa   se promène rapidement à pied ~~avant le petit dejeuner~~.
Every day  during summer, father  has a walk  quickly    on foot before the breakfast.

Chinese
Xià Tiän Dè Shí Hòu, Fù Qīn ~~Mei Tiän Zài Zäo Fàn Qián~~ Kuài Zǒu Yì Hěr
Summer      during   dad      every day during breakfast before brisk walk  a while

Japanese
TITI HA NATUNO AIDA HA ~~MAINITI TYOUSYOKU NO MAE NI~~ SANPO WO SIMASU
Dad  the summer during   every day breakfast    before a brisk walk  takes 4) ~~It might be the case that~~ *John will go to the store.*
Dutch
~~Het zou  kunnen dat~~ John naar de winkel gaat.
It might can    that John to  the store  goes
→ John gaat misschien naar de winkel
→ John zou naar de winkel kunnen gaan

German
~~Es kann sein, dass~~ John zum   Laden gehen wird.
It can  be,  that John to the store  go    will
→ John wird vielleicht zum laden gehen

French
~~Il se pourrait que~~ John aille    au    magasin.
It appears     that John will-go to-the store

Chinese
Yuē Hàn Kě Néng Yào Qù Shäng Diàn
John    might be  will go  the store

Japanese
~~KONOBAAI~~ JOHN HA SONOMISE NI IKU KAMO ~~SIRENAIDESUNE~~
The case    John    the store   to  go  will  it might be (that)

Fig. 11B

5) *It is the case that John will go to the store.*
Dutch
~~Het is het geval dat~~ John naar de winkel gaat.
It   is the case that John to   the  store goes
→ John gaat naar de winkel

German
John wird ~~auf jeden Fall~~ zum Laden  gehen.
John will  in every case  to the store  go

French
~~C'est le cas~~ que John    ira   au magasin.
It is the case that John will-go to the store

Chinese
Yuë Hàn Yào  Qù  Shäng Diàn
John     will go   store

Japanese
~~KONOBAAI~~ JOHN HA SONOMISE NI IKU    ~~DESYOUNE~~
The case      John     the store     to   will go   it is (that)

Fig. 11C

| Template | Type of Template |
|---|---|
| Like in X, _ → _ | Contrast/Comparative Markers |
| Unlike in X, _ → _ | Contrast/Comparative Markers |
| As in X, _ → _ | Contrast/Comparative Markers |
| NP as good as VP → NP VP | Contrast/Comparative Markers |
| if(MainClause.pronouns==FALSE); SubordinateClause, MainClause_→MainClause_ | Proposed Subordinate Clauses |
| if(MainClause.pronouns==FALSE); PrepositionalPhrase MainClause_→MainClause_ | Proposed Subordinate Clauses |
| (Section)/(sub-section) _→_ | Explicit Document/Argument Organizing Markers |
| In the (first/second/third) place _→_ | Explicit Document/Argument Organizing Markers |
| (Firstly),(secondly) _→_ | Explicit Document/Argument Organizing Markers |
| (First of all)/(In conclusion)/(To conclude) _→_ | Explicit Document/Argument Organizing Markers |
| To wrap up X, _→_ | Explicit Document/Argument Organizing Markers |
| To begin the discussion (of X) _→_ | Explicit Document/Argument Organizing Markers |
| To return to a point made earlier _→_ | Explicit Document/Argument Organizing Markers |
| To continue the discussion of X, _→_ | Explicit Document/Argument Organizing Markers |
| That be* said _→_ | Explicit Document/Argument Organizing Markers |
| It could be argued that _→_ | Explicit Document/Argument Organizing Markers |
| NounPhrase, NounPhrase, PrepositionalPrase, NounPhrase, (VerbPhrase/PrepositionalPhrase)→ NounPhrase (VerbPhrase/PrepositionalPhrase) | Appositives |
| NounPhrase, that/which the one who(m) X, SubordinateClause_→_ | Nonrestrictive Relative Clauses |
| (Very)/(Intensely)/ (Extremely)/(Terribly)/(Wonderfully) _→_ | Intensifiers/Dampers |
| (Almost)/(Barely)/(Just) _→_ | Intensifiers/Dampers |
| (More/Most) importantly, _→_ | Attitudinal Markers |
| (Most important of all)/(Normally)/ (Certainly)/(perhaps)_→_ | Attitudinal Markers |
| (As usual)/(Of course) _→_ | Attitudinal Markers |
| (Fortunately/Hopefully),/./:/; _→_ | Attitudinal Markers |
| It be* Adjective.Evaluative that _→_ | Attitudinal Markers |
| The/A best/worst possible thing/outcome/result (Prepositional Phrase) be* SubordinateClause_→ SubordinateClause | Attitudinal Markers |
| ,as be* NOUN.Possessive/PRONOUN.Possessive, habit/want/practice/delight/predeliction_→_ | Attitudinal Markers |

Fig. 12

| | |
|---|---|
| (and/or)_ _→_ | Conjunctions |
| (So)/(Therefore)/(However)(As a result) _→_ | Logical Connectives |
| _1_, so _2_ → _2_ | Logical Connectives |
| (Specifically)/(Speaking more generally)/(In the general case)/(For example)/(In general)/(Among other things)(Among others), _→_ | Specificity Markers |
| (In my opinion,)/(According to me)/(I think that)/(This writer believes)/ (In the opinion of the present author) _→_ | First Person Assessment Statements |
| (Yet)/(Still)/(Ever)/(At first glance,)/(Initially)/(At first)/(Now)/(Until recently)/(In the past)/(Until now)/(Until then)/(So far,)/(Meanwhile,)/(Recently) _→_ | Temporal Indicators |
| At this point in time _→ Now _ | Temporal Indicators |
| Than ever before _→Than before | Temporal Indicators |
| For a NOUN.temporal_ | Temporal Indicators |
| Whenever _→_ | Temporal Indicators |
| Floating.Quantifier _→_ | Determiners |
| DET of the NUM? Adjnn* NOUN_→ DET ADJnn* NOUN_; DET.text <>"each"; NOUN.plural=TRUE | Determiners |
| Each of the NUM? Adjnn* NOUN _→ Each ADJnn* _transform(NOUN).singular _ | Determiners |
| DET? ADJ* NOUN (of) DET? ADJ* NOUN _→ DET? ADJ* NOUN | Determiners |
| most (important/significant/beautiful) be* that _→_ | Determiners |
| /(*/) _→_ | Explicitly Marked Asides |
| --*-- _→_ | Explicitly Marked Asides |
| --*/:/; _→_ | Explicitly Marked Asides |
| (PrepositionalPhrase.manner/AdverbialPhrase.manner)nn (PrepositionalPhrase.manner/AdverbialPhrase.manner)_ →(PrepositionalPhrase.manner/AdverbialPhrase.manner)_ | Manner Indicators |
| (PrepositionalPhrase.location/AdverbialPhrase.location)_ (PrepositionalPhrase.location/AdverbialPhrase.location)nn →(PrepositionalPhrase.location/AdverbialPhrase.location)_ | Location Indicators |
| (PrepositionalPhrase.temporal/AdverbialPhrase.temporal)nn (PrepositionalPhrase.temporal/AdverbialPhrase.temporal)_ →(PrepositionalPhrase.temporal/AdverbialPhrase.temporal)_ | Temporal Indicators |

Fig. 13

| | |
|---|---|
| Please. _→_ | Politeness Markers |
| _post_processing(Thank you. _→_ ) | Politeness Markers |
| If you could be so _ as to _S_→_S_ | Politeness Markers |
| If you would/can/will/could _S_,/.→_S_ | Politeness Markers |
| If you are able to _S_,/.→_S_ | Politeness Markers |
| _S_ If you (would/can/will/could),/.→_S_ | Politeness Markers |
| _S_ If you are able to,/.→_S_ | Politeness Markers |

Fig. 14

SYSTEMS AND METHODS FOR GENERATING ANALYTIC SUMMARIES

BACKGROUND OF THE INVENTION

1. Field of Invention

This invention is related to generating text summaries and to compressing text summaries generated by other text compression or summary generating systems and methods.

2. Description of Related Art

Users of information systems must typically absorb large amounts of information to accomplish their information acquisition goals.

In response, vendors of corporate information systems have attempted to increase the efficiency of business processes by providing greater quantities of information to users ever more quickly. As the number of information suppliers and frequency of reporting has increased, users find themselves deluged with information.

In response, commercial, academic and government researchers have developed summary generating systems to decrease the amount of information that a user must absorb. Summarizing documents or content portions will always result in a loss of information. However, successful summarization requires choosing information to delete that minimizes information loss while preserving the meaning of the remaining portions and maximizing the meaning of the resultant summary.

For example, conventional summary generating methods may pick out isolated words or phrases from a text and print them out in sequential order. These conventional summary generating methods give an indication of some of the entities or events described by the text, but neither the point of the text nor the meaning of the individual words or phrases in context will be recoverable. The structure and readability of the original sentence is not preserved and will frequently contain unresolved and/or incorrectly resolved pronouns and other referential items. Since these conventional summary generating methods affect the grammar of sentences in the text, the readability of the text is degraded. These conventional summary generating systems may also omit punctuation in phrases or sentences making the summary difficult to understand. Conventional summary generating methods select sentences for inclusion in the summary based on statistical criteria including such information as position of a sentence in a paragraph, the position of a paragraph in a document as well as statistical information about the frequency of co-location patterns of lexical items in the document. Therefore the selected sentences do not necessarily follow each other coherently. Referential integrity is not necessarily preserved which may result in referential ambiguities. The resulting summary is therefore difficult to read. Conventional methods that use sentence extraction and keyword extraction techniques are better able to produce informative summaries. However such methods pose problems of how to choose the sentences or phrases to extract.

Corston-Oliver describes several text compaction methods that operate on a sentence by sentence level in "Text Compaction for Display on Very Small Screens", Corston-Oliver, S., in North American Chapter of the Association for Computational Linguists (NAACL) 2001 Language Technologies Workshops Jun. 3–4, 2001. These methods include language dependent character removal strategies, white space compaction using initial word capitalization and the normalization of items such as company names, dates, personal proper nouns and numbers.

Another conventional summarization system is described in "Producing Intelligent Telegraphic Text Reduction to Provide an Audio Scanning Service for the Blind" in Intelligent Text Summarization, AAAI Spring Symposium Series, Stanford, Calif., 1998, p. 111–117. However, these text compaction strategies do not preserve the grammaticality of the sentences of the text, which would make the result more readable. This property of texts is referred to as grammatical readability.

Many of these problems are addressed in commonly assigned copending U.S. patent application Ser. No. 09/689,779, entitled "System and Method for Generating Text Summaries", incorporated herein by reference in its entirety. In the '779 application, a structural representation of discourse according to a theory of discourse analysis is created, a rank is determined and nodes having a rank less than or equal to the determined rank are output as a summary. Summaries are provided based on the selective display of text building units from a structural representation of discourse. The techniques discussed in the '779 application preserve referential integrity, coherency and punctuation. However, these techniques for generating text summaries cannot generate summaries shorter than the actual lengths of the highest ranked text building units in the structural representation of discourse.

SUMMARY OF THE INVENTION

Therefore, methods of generating grammatical and coherent summaries, which do not contain referential ambiguities and in which sentences follow each other coherently would be useful. Methods of further summarizing the summaries generated by various other summary generating methods would also be useful.

The systems and methods for generating analytic summaries according to this invention exploit linguistic information concerning the function of sentence constituents to determine which sentence constituents to compress and which sentence constituents to retain based on an analysis of the informativity or information content of the sentence constituent. The informative core of a noun phrase consists of the noun and the determiner. The informative core of a verb phrase consists of the main verb. The informative core of sentence consists of 1) the verb in the main clause; 2) the informative core of the complement of the main verb if the syntactic specification of the specific verb requires a verbal phrase to complete its meaning; 3) the informative cores of the arguments of the main verb which express the entities implicated in the action or activity expressed by the specific verb; and 4) all words expressing tense, modality and polarity information.

All other words in the sentence are parts of modifiers or connectives which simply add more information about one of the main components or connectors. For example, adjectives, adverbs, contrastive and comparative markers, explicit document and organizing markers, preposed subordinate clauses, appositives, non-restrictive relative clauses, intensifiers and dampers, attitudinal markers, conjunctions, logical connectives, specificity markers, first person assessment statements, determiners, explicitly marked asides and temporal, manner and location indicators all merely add information concerning the main components or connectors. The systems and methods for generating analytic summaries according to this invention exploit linguistic theory to identify the informativity of sentence constituents based on sentence structure and the contributions made by various sentence constituents to the meaning of the sentence.

Adjectives are identified as modifying elements. Therefore modifiers of adjectives can be deleted before eliminating the adjectives themselves. However, in some cases, the type of text or genre may preclude compression of certain types of information. In geographic or topological texts, spatial relationship information is critical and should not be compressed. Therefore in various exemplary embodiments according to this invention, the degree of compression of various constituent elements may also be adjusted based on the type or genre of the text.

The various systems and methods for generating analytic summaries according to this invention may be used either before or after any other conventional method or apparatus for generating summaries.

BRIEF DESCRIPTION OF THE DRAWINGS

FIG. 6 is an exemplary text;

FIG. 7 is an exemplary text indicating portions to be compressed according to this invention;

FIG. 8 is an exemplary analytic summary according to a first exemplary embodiment of this invention;

FIG. 9 is an exemplary analytic summary with an expanded portion according to a first exemplary embodiment of this invention;

FIG. 10 is an exemplary analytic summary according to a second exemplary embodiment of this invention;

FIGS. 11a–11c is a table of exemplary sentences or phrases to be compressed in multiple languages;

FIG. 12 is a first exemplary template storage structure according to a first exemplary embodiment of this invention;

FIG. 13 is a second exemplary template storage structure according to a first exemplary embodiment of this invention.

FIG. 14 is a third exemplary template storage structure according to a first exemplary embodiment of this invention.

DETAILED DESCRIPTION OF EXEMPLARY EMBODIMENTS

Figure 1:
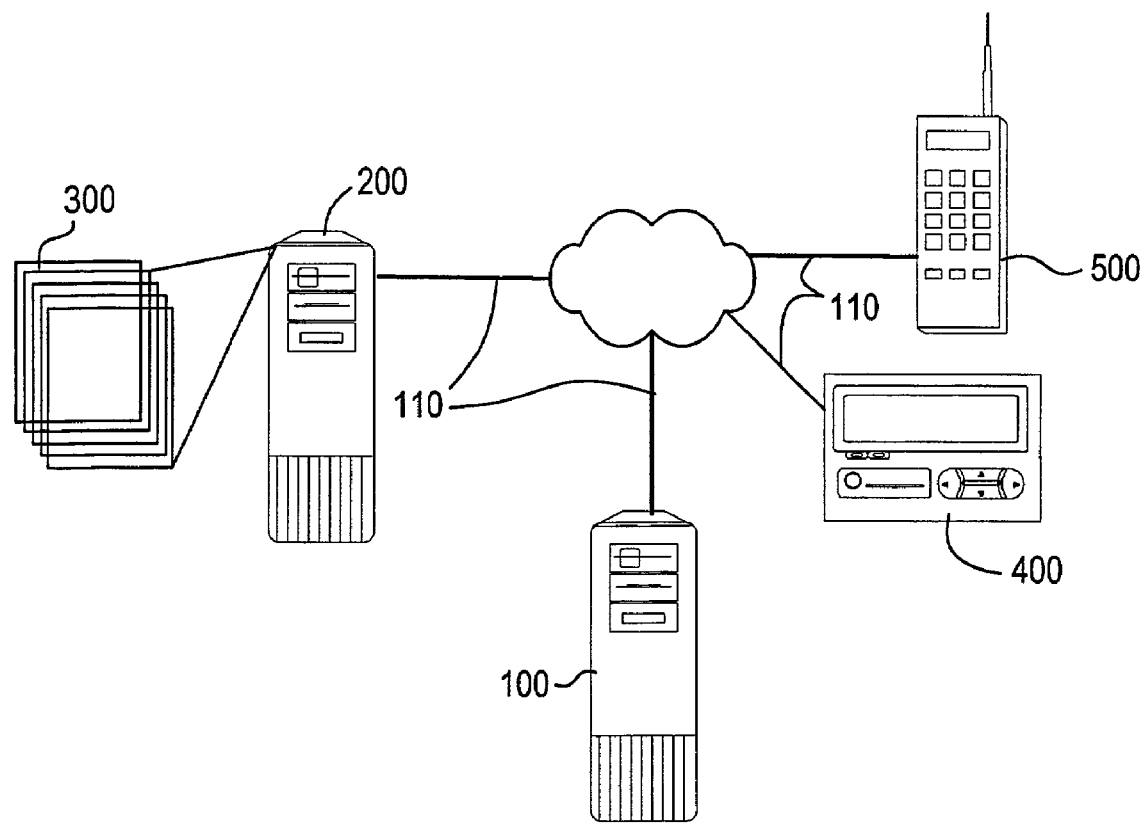
FIG. 1 is a block diagram of a first exemplary embodiment of a system for generating analytic summaries according to this invention.

FIG. 1 is a block diagram of one exemplary embodiment of a system for generating analytic summaries according to this invention. Access to one or more information content portions 300 is provided by information source 200 over the communication links 110. The system for generating analytic summaries 100 mediates access to the information source 200 for devices which may require analytic summaries. The analytic summaries generated reflect a compression of the information content of the information content portions 300. In various other embodiments, the system for generating analytic summaries 100 may be used to further compress summaries generated by any other system or method. Alternatively, the analytic summary generated by the system for generating analytic summaries 100 may be used as input to any other summary generating system.

For example, web-enabled phone 500 requests information content portion 300. However, information content portion 300 is too large to display on the limited display of the web-enabled phone 500. The system for generating analytic summaries 100 may be used to mediate access. The system for generating analytic summaries acts as a proxy that receives the request for information content portion 300 from web-enabled phone 500. The system for generating analytic summaries 100 forwards the request for the information content portion 300 to information source 200 and receives the response. The information source 200 provides the requested information content portion 300 to the system for generating analytic summaries 100 over communication link 110. The system for generating analytic summaries 100 determines an analytic summary based on the received information content portion 300. The system for generating analytic summaries 100 then sends the generated analytic summary to web-enabled phone 500.

However, it will be apparent that the system for generating analytic summaries 100 may be positioned in any location and/or in any device or system that allows mediation of access between the user and the information source to be summarized. For example, the system for generating analytic summaries may be located within web-enabled PDA 400 or within information source 200 or in any other device or location.

Figure 2:
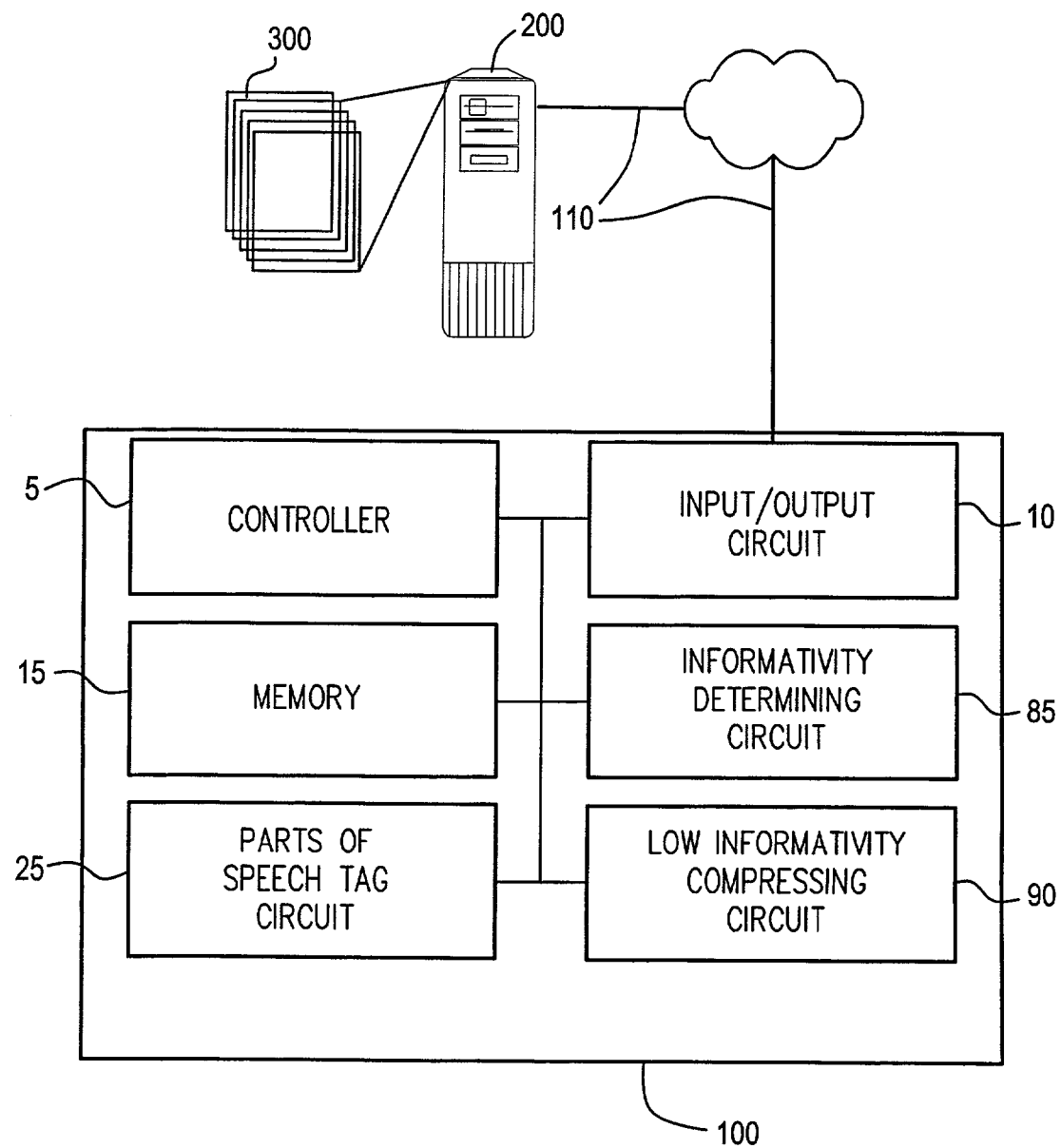
FIG. 2 is an expanded view of a first exemplary embodiment of a system for generating analytic summaries according to this invention.

FIG. 2 is an expanded view of a first embodiment of a system for generating analytic summaries according to this invention. The system for generating analytic summaries 100 comprises a controller 5; a memory 15, a parts of speech tagging circuit 25; an informativity determining circuit 85; and a low informativity compressing circuit 90 connected to an input/output circuit 10. The input/output circuit is connected via communication links 110 to information source 200 which provides access to information content portions 300.

The controller retrieves information content portions 300 from information source 200 via input/output circuit 10 over communication links 110. In one of the various exemplary embodiments according to this invention, the information content portions 300 may be stored in memory 15. The parts of speech tagging circuit 25 is activated to determine parts of speech of each constituent in each of the information content portions 300 stored in memory 15. The informativity determining circuit 85 is activated to determine the informativity of each part of speech of each sentence. The low informativity compressing circuit 90 is activated to compress the constituents which have low informativity while maintaining the grammaticality and readability of the sentence.

For example, when a string of multiple adjectives in a sentence all modify the same noun the additional adjectives simply modify the core or essential adjectives. The additional adjectives are determined by the informativity determining circuit 85 as modifying a modifier. Since the additional adjectives provide only a small increase in information content, they may be compressed without significantly affecting the meaning of the phrase.

The phrase "The big old green boat was in the cold dirty water" contains the three adjectives "big, old and green" all modifying the phrase "boat". Adjectives with low informativity are compressed. In one of the various exemplary embodiments according to this invention, the first and last adjectives are retained since they have the highest degree of informativity. The middle adjectives in strings of adjectives are compressed since they are modifiers of modifiers with the lowest degree of informativity and do not affect the grammatical readability of the phrase.

The stored content portions 300 are compressed without significantly affecting the meaning of the phrase or sentence. It will be apparent however that in various alternative embodiments, the core or essential adjective may be determined using deep syntactic parsing or any other known or later developed method of determining the informativity of the parts of speech of the content portions without departing from the spirit or scope of this invention.

The constituents which are determined to have low informativity are then compressed by the low informativity compressing circuit 90. The low informativity compressing circuit compresses each constituent based on informativity and grammatical readability. Constituents having low informativity and low affect on grammatical readability are compressed first, followed by constituents of successively higher informativity and low affect on grammatical readability until a desired measure of compression of the sentence is reached. The compressed parts of speech may be indicated to the user by compression placeholder characters such as "+" or " . . . ", by an icon or symbol, by a display attribute change such as a change in font color or italicization or any other known or later developed method of indicating a change in the text.

In an alternative exemplary embodiment according to this invention, text content information may be used to modify the compression applied to a content portion. For example, if the content portion is determined to describe geographic or topological information, the informativity ranking of locative information in the uncompressed text would be increased. An increase in the ranking would render locative information less likely to be compressed in the resultant analytic summary.

Since a user may wish to review compressed material, the compressed constituent may be selected for decompression by double clicking on the compression placeholder character, right mouse clicking or any other known or later developed method of selecting text. The selected constituent is then displayed in the uncompressed form in the analytic summary.

Figure 3:
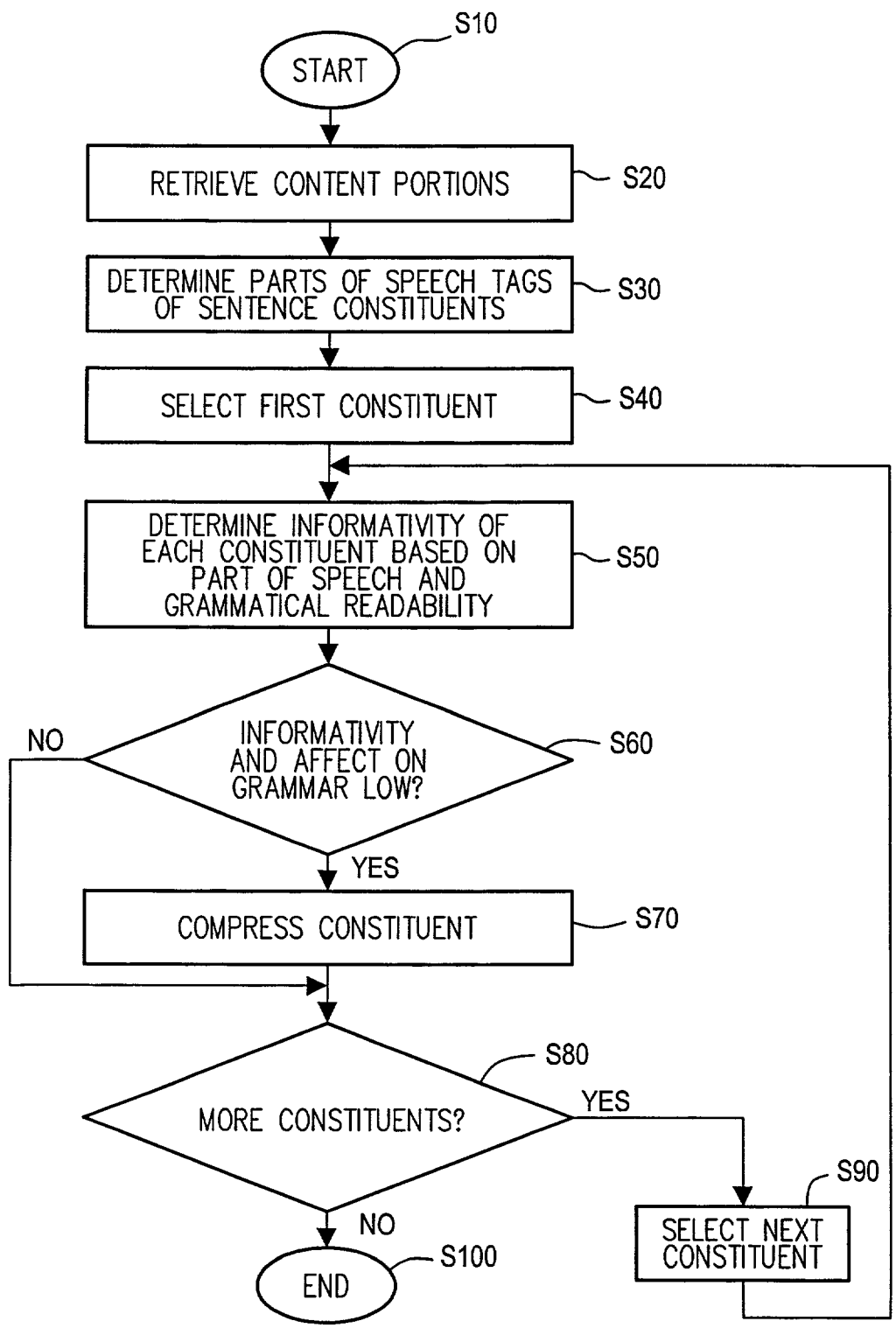
FIG. 3 is a flowchart outlining a first exemplary method for generating analytic summaries according to this invention.

FIG. 3 is a flowchart outlining a first exemplary method for generating analytic summaries according to this invention. The process starts at step and control is transferred to step S20. In step S20, the content portions containing the text to be summarized are retrieved. The content portions may be provided in a memory device, a digital and/or electronic book, an electronic file or document or may be provided by an information source such as an electronic library, document repository, hypertext server or any other known or later developed method of providing information. Control is then transferred to step S30 where the parts of speech of the phrases or sentences in the content portions are determined and tagged. Any method of parts of speech tagging that provides for the determination of words or phrases that are modifiers of the informative core of the phrase or sentence may be used in the practice of this invention. Control is then transferred to step S40 where the first constituent of the first sentence is selected.

Control then continues to step S50 where the informativity of each constituent is determined. Informativity of a constituent is a measure of the additional information provided by the constituent and the effect removal of the constituent would have on the grammatical sense and readability of the phrase or sentence. For example, the informativity of a constituent may be determined using a template to match the occurrence of constituents that occur in sentences. In one of the various exemplary embodiments according to this invention, a table of templates encodes patterns for determining low informativity constituents and associated actions to be taken to compress the determined low informativity constituents while maintaining grammatical readability. However, it will be apparent that any known or later developed method of determining the informativity of constituents may be used in the practice of this invention. Control continues to step S60.

In step S60 a determination is made whether the informativity of the constituent and effect on the grammatical readability is low. Since parts of speech such as modifiers of modifiers have low informativity, they add little information content to a phrase or sentence and may be compressed without significant loss of the information content and/or the grammatical readability of the phrase or sentence. Therefore, if the constituent is determined to have low informativity, control continues to step S70 where the constituent is compressed, otherwise the modifier is determined to have a high degree of informativity and control continues to step S80 without compressing the constituent.

In step S80, a determination is made whether there are additional constituents to be processed. If additional constituents remain to be processed, control continues to step S90 where the next constituent in the sentence is selected. Control is then transferred to step S50 and the steps S50–S90 are repeated until it is determined in step S80 that no additional constituents remain to be processed. When it is determined that no additional constituents remain to be processed, control continues to step S100 and the process ends.

Figure 4:
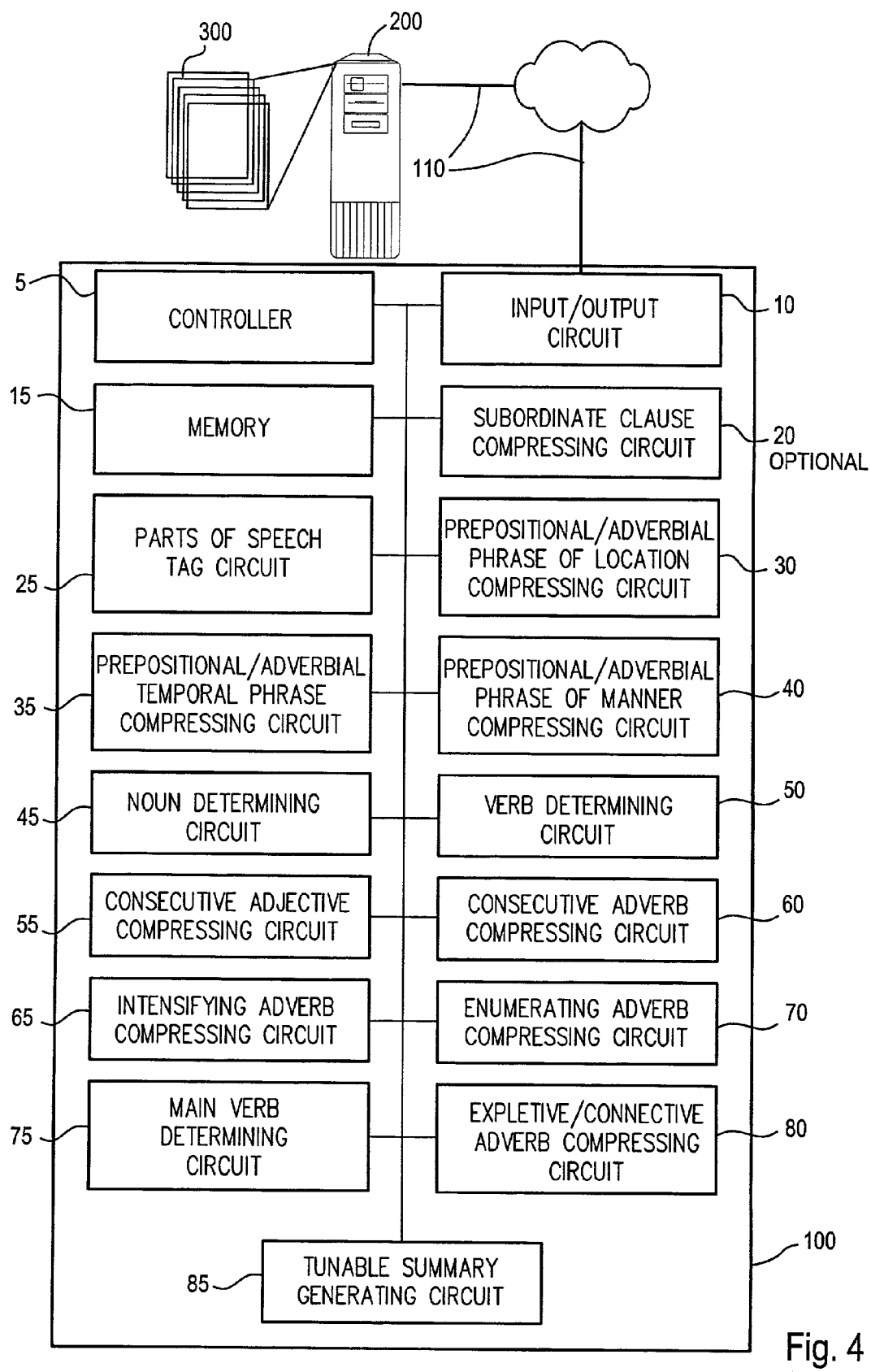
FIG. 4 is an expanded view of a second exemplary embodiment of a system for generating analytic summaries according to this invention.

FIG. 4 is an expanded view of a second exemplary embodiment of the system for generating analytic summaries 100 according to this invention. The system for generating analytic summaries 100 comprises a controller 5; an input/output circuit 10; a memory 15; optional subordinate clause compressing circuit 20; a parts of speech tag circuit 25; a prepositional/adverbial phrase of location compressing circuit 30; a prepositional/adverbial temporal phrase compressing circuit 35; a prepositional/adverbial phrase of manner compressing circuit 40; a noun determining circuit 45; a verb determining circuit 50; a consecutive adjective compressing circuit 55; a consecutive adverb compressing circuit 60; an intensifying adverb compressing circuit 65; an enumerating adverb compressing circuit 70; a main verb determining circuit 75; an explitive/connective adverb compressing circuit 80 and optional tunable summary generating circuit 85.

The input/output circuit 10 is connected via communication links 110 to an information source 200 that provides access to information content portions 300. The controller 5 activates the input/output circuit 10 to retrieve one or more of the information content portions 300 provided by information source 200 over the communication links 110. In one of the various exemplary embodiments, the information source 200 may be a hypertext document server. However, it will be apparent that any information source such as a digital library server, document collection server, hypermedia text collection server or any other known or later developed method of providing information to a user may be used in the practice of this invention.

Similarly, the information content portions may be hypertext mark-up language documents, documents in an electronic collection or library, hypermedia documents or any other known or later developed information content portions. In various other exemplary embodiments according to this invention, the information content portions 300 may be stored directly in memory 15. In still other exemplary embodiments according to this invention, the information content portions 300 are retrieved and the optional tunable summary generating circuit 85 is activated to create a tunable text summary based on the retrieved content portions 300. The tunable text summary may be stored in memory 15. The tunable summary may then be used as input to the system for generating analytic summaries according to this invention to generate an analytic summary based on the previously compressed tunable summary. The optional subordinate clause compressing circuit 20 may be activated to suppress subordinate clauses as a pre-processing or post-processing step according to this invention.

The retrieved information content portions 300 may be stored in memory 15. The parts of speech tag circuit 25 is then activated to identify the parts of speech within each of the information content portions 300. The parts of speech tag circuit 25 may include but is not limited to any syntactic parser and/or parts of speech tagger or any other known or later developed method of parts of speech tagging.

The controller 5 activates the prepositional/adverbial phrase of location compressing circuit 30 for each phrase in the information content portions 300. The prepositional/adverbial phrase of location compressing circuit 30 determines each prepositional/adverbial phrase of location or locative adverbial phrase that modifies a given entity or event in the phrase. The prepositional/adverbial phrase of location compressing circuit 30 compresses each prepositional/adverbial phrase of location that modifies a given entity or event except the first. For example, given the phrase "He ate the donuts in the kitchen near the window", the prepositional phrases of location are 1) "in the kitchen" and 2) "near the window". The first prepositional phrase "in the kitchen" is retained and the second prepositional phrase "near the window" is compressed. Though the phrase is compressed, the overall meaning and grammatical readability of the phrase or sentence is maintained. The reader of the analytic summary will still understand the action to have occurred "in the kitchen" since only the secondary location information "near the window" is compressed. In various other exemplary embodiments according to this invention, the phrases may be removed instead of being compressed without departing from the spirit or scope of this invention.

The controller 5 activates the temporal prepositional/adverbial phrase compressing circuit 35 to determine each temporal prepositional/adverbial phrase that modifies a given entity or event in the phrases or sentences of information content portions 300. The temporal prepositional/adverbial phrase compressing circuit 35 then compresses each temporal prepositional/adverbial phrase that modifies a given entity or event except the last. The compressed prepositional/adverbial phrases may be indicated to the user by characters such as "+" or " . . . ", by an icon or symbol, by a display attribute change such as a change in font color or italicization or any other known or later developed method of indicating a change in the text.

For example, given the sentence "He ate the donuts in the kitchen at 4 pm on Sunday", the first temporal phrase is "at 4 pm" and the second temporal phrase is "on Sunday". Therefore the phrase "at 4 pm" is compressed and the resulting phrase is "He ate the donuts in the kitchen on Sunday".

The controller 5 activates the prepositional/adverbial phrase of manner compressing circuit 40 to compress each of the prepositional/adverbial phrases of manner in each phrase or sentence of the information content portions 300 except the last. For example, given the phrase or sentence "He painted the garage door according to the directions with very smooth strokes", the first prepositional/adverbial phrase of manner is "according to the directions". The phrase "with very smooth strokes" is the second prepositional/adverbial phrase. The prepositional/adverbial phrase of manner compressing circuit 40 compresses the original phrase to "He painted the garage door with very smooth strokes." As discussed above, the resulting compressed phrase or sentence may indicate the compressed material using any known or later developed method of indicating a change in the phrase or sentence. The resulting phrase or sentence is compressed and yet still conveys the essential meaning while preserving the grammatical readability of the phrase.

The controller circuit 5 activates the noun determining circuit 45. The noun determining circuit 45 determines the nouns occurring in a phrase or sentence. The consecutive adjective compressing circuit 55 is activated to compress consecutive adjectives describing each determined noun. The compression may be accomplished by compressing a string of adjectives describing a noun to the first and last adjectives in the string. For example, given the sentence "The big old green boat was in the cold dirty water", the noun "boat" is modified by the string of consecutive adjectives "big old green". The consecutive adjective compressing circuit 55 compresses the string of consecutive adjectives to "big green" by compressing all adjectives except the first and last consecutive adjectives in the string.

Similarly, the noun "water" is modified by the string of adjectives "cold murky dirty". The consecutive adjective compressing circuit 55 compresses the string of consecutive adjectives to "cold dirty". The resulting sentence or phrase "The big green boat was in the cold dirty water" reflects a compression which does not substantially disturb the meaning or grammatical readability of the phrase or sentence. As discussed above, compression of phrases may be indicated to the user with an icon, a specific display character, a display attribute change or any other known or later developed method of indicating a change in the text.

The controller 5 activates the verb determining circuit 50 to determine each verb in the phrase or sentence. The consecutive adverb compressing circuit 60 is activated to compress strings of consecutive adverbs modifying each determined verb in the phrase or sentence. The strings are compressed by retaining only the first and last adverb in each string of consecutive adverbs. As discussed above, compression of phrases may be indicated to the user using any known or later developed method of indicating a change in the text.

For example, the phrase or sentence "Dad takes a brisk walk before breakfast every day during the summer." contains two adverbial phrases, "before breakfast" and "every day during the summer." The first adverbial phrase "before breakfast" is compressed and the resulting phrase becomes "Dad takes a brisk walk every day during the summer." The phrase or sentence is thereby compressed without any substantial loss of meaning or grammatical readability.

The intensifying adverb compressing circuit 65 is activated to compress intensifying adverbs immediately preceding adjectives. For example, the adverbs "very", "awfully" and other intensifying adverbs are compressed by the intensifying adverb compressing circuit 65. As discussed above, the compressed intensifying adverbs are indicated by a character, icon or display attribute change in each compressed phrase or sentence.

The enumerating adverb compressing circuit 70 is activated to compress the enumerating adverbs. Enumerating adverbs include "firstly", secondly and other enumerating adverbs determined by the parts of speech tag circuit 25.

The main verb determining circuit 75 is activated to determine the main verb in the phrase or sentence based on the parts of speech tag circuit 25. The expletive/connective adverb compressing circuit 80 is activated to compress expletive adverbial phrases such as "there are" and connectives such as "that" or "which". The compression of connectives may require recognition of fixed phrases such as the phrase "It might be the case that John will go to the store." The connective that connects the idiomatic phrase "It might be the case" carries a small amount of information content and may be compressed with little effect on the substantial meaning of the sentence, provided the main verb of the remainder is adjusted in a deterministic way. Fixed phrases like these can be recognized with a template, and the required change of the main verb can be adjusted deterministically using the actual verb used in the fixed phrase. As an example, the following template matches "It might be the case that" and a number of related cases:

$$\text{It AV (to) be (the case|true) that S} \tag{1}$$

In the case of "It might be the case that", the variable AV has "might be" as its value. This is combined with the main verb of the remainder S, "might will go". This is not itself a grammatical construction, however it will be apparent that by using the well known principles of the logic of modality, this can be reduced to "might go". Both these templates and the rules of modality can be implemented using finite state descriptions, table lookups or any other known or later developed method. Each phrase or sentence in the information content portions 300 is analyzed. The analytic summary that is generated preserves coherency, punctuation and grammatical readability.

The order of the activation has been described in a particular order for discussion purposes. However, it will be apparent that any one or more of the circuits may be activated in any order in the practice of this invention.

Figure 5A:
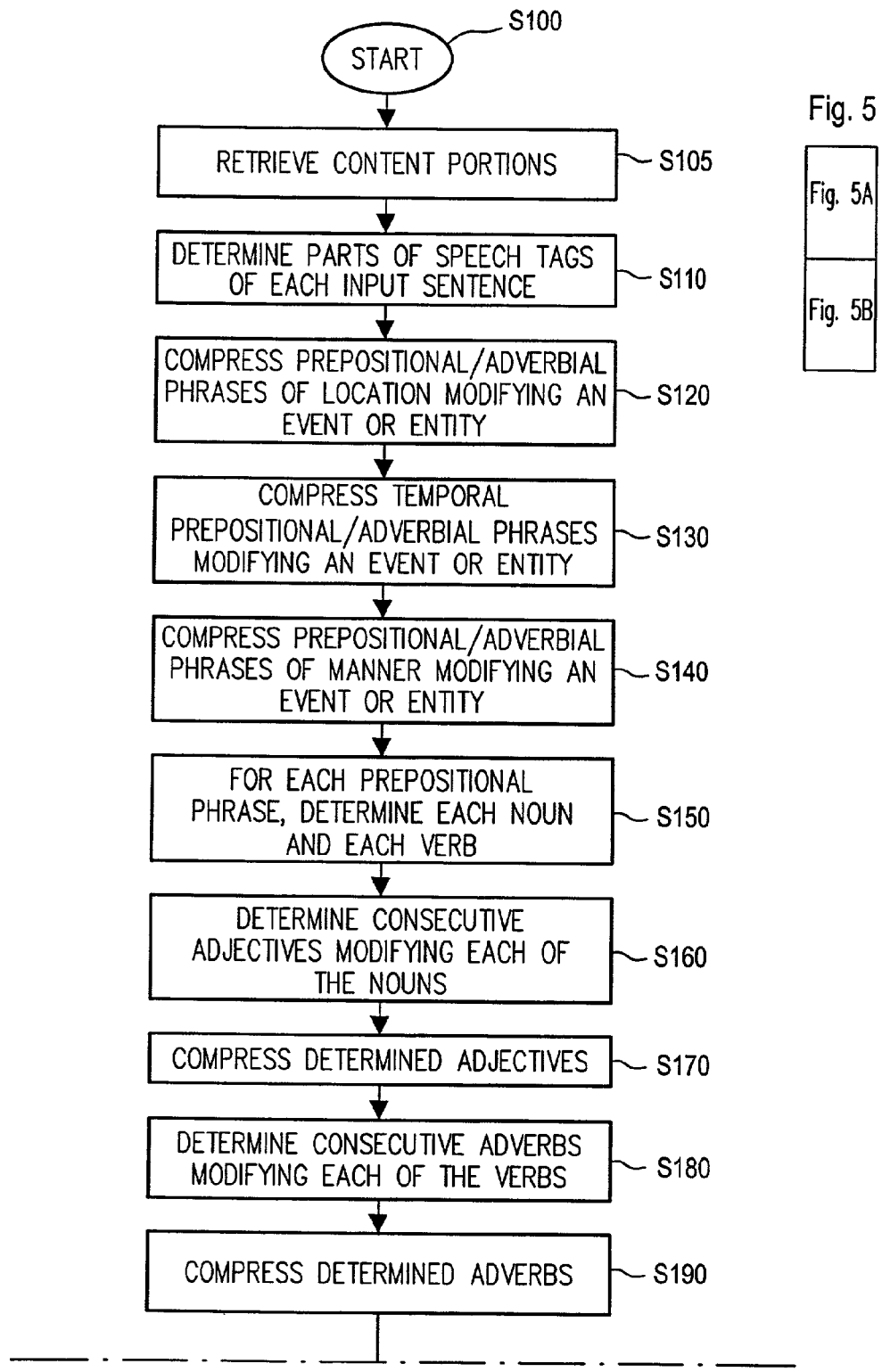
FIGS. 5A–B is a flowchart outlining a second exemplary method for generating analytic summaries according to this invention.
Figure 5B:
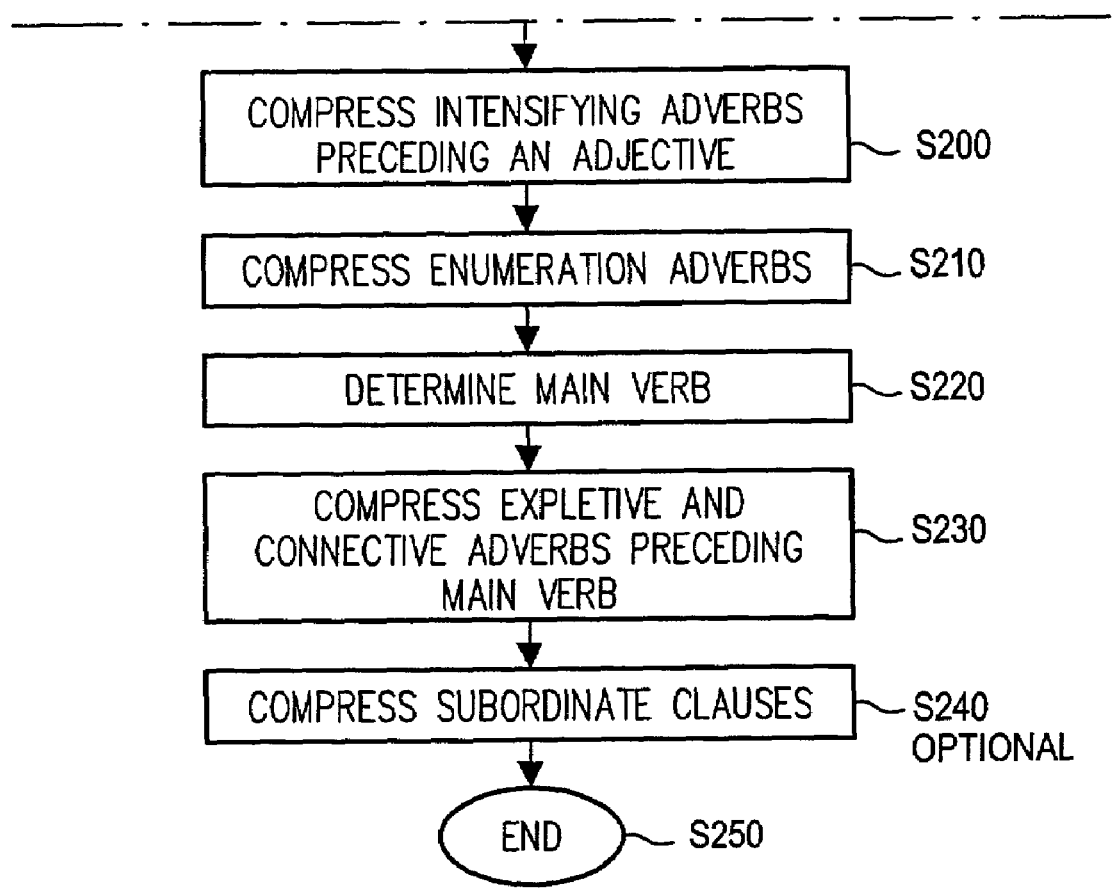

FIG. 5 is a flowchart outlining a second exemplary method for generating analytic summaries according to this invention. The process starts at step S100 and continues to step S105. In step S105, the content portions to be summarized are retrieved. Control then continues to step S110 where the parts of speech of the constituents of the phrases or sentences of the content portions are determined and tagged.

The parts of speech of the phrases or sentences may be determined using shallow parsing systems, deep parsing systems or any other known or later developed method of determining parts of speech tags for a phrase or sentence.

Control then continues to step S120 where the prepositional/adverbial phrases of location are determined. All prepositional/adverbial phrases of location except the first prepositional/adverbial phrase of location modifying an event or entity are compressed. Control continues to step S130. As discussed above, compression of prepositional/adverbial phrases of location may be indicated to the user with any known or later developed method of indicating a change in the text.

In step S130, all temporal prepositional/adverbial phrases except the last temporal prepositional/adverbial phrase modifying an event or entity are compressed. Control then continues to step S140 where all prepositional/adverbial phrases of manner except the last prepositional/adverbial phrase of manner are compressed. As discussed above, compression of prepositional/adverbial phrases of manner may be indicated to the user with any known or later developed method of indicating a change in the text. Control then continues to step S150 where the nouns and verbs of each prepositional phrase are determined. In step S160, the consecutive adjectives modifying each of the determined nouns in the phrase or sentence are determined and control continues to step S170.

The adjectives determined in step S160 are compressed in step S170. For example, strings of consecutive adjectives may be replaced with the first and last adjectives in the string. Since the first and last adjectives provide substantially all the meaning of the adjective phrase, the overall meaning of the phrase is preserved. Adjectives conveying little information content are compressed while the grammatical readability of the phrase or sentence is maintained. Control continues to step S180.

In step S180 consecutive adverbs that modify each of the determined verbs are identified. Control continues to step S190 where the determined adverbs are compressed. For example, strings of adverbs may be replaced with the first and last adverbs in the string. Since the first and last adverbs provide substantially all the meaning of the adverbial phrase, the meaning is preserved and grammatical readability of the phrase is preserved. Control continues to step S200 where the intensifying adverbs preceding adjectives are compressed. Intensifying adverbs may include for example, "very", awfully" and other intensifying adverbs determined by the parts of speech tagging step S110.

The enumeration adverbs in the sentence are compressed in step S210. The enumeration adverbs may include for example, "firstly", "secondly" and other enumeration adverbs determined during the tag parts of speech step S110. Control then continues to step S220 where the main verb in the sentence or phrase is determined.

In step S230, the expletive and connective adverbial phrases that precede the main verb are compressed. As discussed above, expletive adverbs such as "there are" are compressed. Similarly connectives such as "that" or "which" are compressed. Control then continues to step S240 where optional subordinate clauses are compressed. In various alternative embodiments according to this invention, subordinate clause compression may be optionally performed before or after any of steps S105–S240 discussed above. Control then continues to step S250 where the process ends.

FIG. 6 is an exemplary text. The exemplary text contains several sentences containing information that can be compressed using the systems and methods according to this invention.

FIG. 7 is an exemplary text with markers indicating the text that has been changed. Compressed text is indicated between angled brackets "< >". Added text is underlined.

For example, the phrases <near the window> and <at 4 pm> have been compressed since "on Sunday" is the last temporal prepositional/adverbial phrase. The phrases <stale> and <half-torn> are compressed since these phrases are not the first and last adjectives in the string of consecutive adjectives. The phrase <during dinner every day> is compressed since the phrase is not the final adverbial phrase modifying the verb. Finally the phrase <It might be that case that> is compressed and the verb phrase <will> is adjusted to "might" since the connective adverbial "that" is determined.

FIG. 8 is an exemplary analytic summary indicating the compressed text by the compression placeholder or indicator " . . . ". The user may select the compression placeholder or indicator by clicking on it with a mouse or selecting it with any method of selection. The selected portions of the analytic summary are then expanded by displaying the compressed text. If adjustments to the text are required, such as the adjustment of the verb "will" to "might" discussed above, the recognized phrase such as "It might be that case that" will also be displayed.

FIG. 9 is an exemplary analytic summary showing a compression placeholder or indicator that has been expanded. The compression placeholder or indicator associated with the phrase <during the dinner every day> has been selected. It will be apparent that any method of indicating compressed text and any method of selecting compressed text may be used in the practice of this invention.

FIG. 10 is an exemplary analytic summary according to a second exemplary embodiment of this invention in which compressed portions are indicated by changing a display attribute of the text. For example, by bolding the font or typeface of the word following the compressed text. Similarly the compressed text may be indicated by bolding of the font or typeface of the text preceding the compressed text or any other known or later developed method of indicating changes to the text. The bolded text may be selected by clicking or highlighting of the text or any other known or later developed method of selecting text.

FIG. 11a–11c is a table of exemplary sentences to be compressed in multiple languages. Each sentence contains an English sentence and the sentence written in the Dutch, German, French, Chinese and Japanese languages. The compression of constituents having low informativity is shown with a strike through. An English language gloss with a literal translation appears below each alternate language phrase to indicate the constituents in each phrase for each language. Thus, it will be apparent that the system for generating analytic summaries 100 can be used with any language for which parts of speech, informativity of constituents dan grammatical readability can be determined.

For example, the first phrase "He ate the donuts in the kitchen near the window at 4 pm on Sunday" shows an English language gloss of the corresponding Dutch phrase indicating that the Dutch language parts of speech having low informativity may be easily identified and compressed. The English language gloss of the corresponding German phrase reveals a different ordering of words or phrases that occur in English. However, since each of the parts of speech are determined to relate to the same objects, the compression of constituents having low informativity and low effect on grammatical readability can still be accomplished.

Similarly, the English language glosses of the corresponding French, Chinese and Japanese language phrases also reveal different ordering compared with the English phrase. However, since the parts of speech for each event or object in the sentence are easily identifiable and easily processed, these differences have no significant impact on the generation of an analytic summary according to this invention.

FIG. 12 shows a first exemplary template storage structure 600 for storing templates for matching and compressing parts of speech according to one of the various embodiments of this invention. The templates are merely illustrative of the types of determining and compression of text which may be accomplished according to this invention. It should be understood that any method of identifying parts of speech and performing compression may be used in the practice of this invention.

The exemplary template storage structure 600 contains a template portion 610 and a type of template portion 620. In one exemplary embodiment according to this invention, the exemplary storage structure 600 is stored in memory 15. However it will be apparent that the exemplary storage structure 600 may be stored in a file on a magnetic or optical disk drive, stored in a read memory device such as a ROM, static RAM or stored using any other known or later developed system or method for storing information. Each template is optionally associated with a type of template stored in the type of template portion 610. The type of template portion 620 may be used in conjunction with an optional type of text indicator assigned to a text or which may be determined programmatically. The type of text indicator may be used to determine the appropriate types of compression to perform based on the type of text and the informativity of the parts of speech. Thus, for example, locative compression may be suppressed for texts determined to have geographic or spatially descriptive content.

Each template stored in template portion 610 contains a phrase recognition portion associated with a compression rule specifying how the compression should be performed. The exemplary templates stored in the exemplary template storage structure 600 use a pattern matching template for matching. For example, the "_" character matches the remainder or body of a phrase or sentence, while "*" matches on any word. The expression "Be*" matches any form of the copula and "verb*" matches any form of the specified verb. Words or literals may be specified in the alternative by separating them with the "/" character. The expression "nn" indicates multiple occurrences of a pattern and the expression "_S_" matches any well formed sentence.

The symbol "–>" indicates the beginning of the second or action portion of the rule. Any phrase for which a match occurs in the head of the rule activates an associated action used to adjust the phrase. Therefore, the simple rule "However, _–>_" can be use to identify phrases starting with the word "However" followed by a comma. The associated action portion of the rule then removes the word "However" as well as the comma and outputs the result.

The rules may include matching portions that are activated or fired based on the appearance or existence of linguistic constructs such as noun phrases, verb phrases, main clauses, subordinate clauses, prepositional phrases, possessive nouns, possessive pronouns, determiners, adjectives or any other determinable linguistic construct in the text. The symbol ";" indicates that the logical connection "provided that" links the two clauses. The symbol "X" matches on any portion of the text.

The first template in the exemplary template storage structure 600 contains the rule, "Like in X, _–>_". This rule provides that any sentence that contains contrastive/comparative markers may be compressed while maintaining grammatical readability. For example, the phrase "Like in school, we had to watch our manners" can be adjusted to "We had to watch our manners".

Similarly, the second rule operates on example text "Unlike in the army we slept indoors" to create the phrase "We slept indoors". This represents a compression of seven words to three words while maintaining grammatical readability. The third line of the exemplary table contains a rule that adjusts phrases such as "As in school, we played sports" to "We played sports" reflecting a compression of the six original words to three without disturbing the meaning of the phrase or the grammatical readability. The fourth line of the exemplary template storage structure 600 can be used to compress the phrase "John as good as fired Sam" to "John fired Sam" without a significant loss of meaning or grammatical readability.

The fifth line of the exemplary template storage structure 600 can be used to compress phrases containing preposed subordinate clauses if the main clause does not contain any pronouns. The conditional is shown in the rule by the test condition "if(MainClause.pronouns==FALSE). If MainClause does not contain pronouns the second pattern is evaluated to determine if a subordinate clause precedes the main clause in the sentence. If the subordinate clause precedes the main clause, the subordinate clause is compressed.

The eighth line of the exemplary template storage structure 600 indicates how explicit document and argument organizing markers may be compressed. For example, the phrase "In the first place this engine has been operating too long" can be compressed to "This engine has been operating too long" without disturbing the meaning of the sentence or the grammatical readability of the sentence.

Line sixteen of the exemplary template storage structure 600 indicates how appositives may be compressed. For example, the sentence "John, my uncle, is coming next week" may be compressed to "John is coming next week" without substantial loss of meaning or grammatical readability.

Similarly, line seventeen of the exemplary template storage structure 600 indicates that non-restrictive relative clauses in sentences may be compressed. For example, the sentence "John, the one I told you about, went to the store" may be compressed to "John went to the store". Line eighteen of the exemplary template storage structure 600 indicates that intensifiers may be compressed. For example, the sentence "It would be very nice of you to walk her home" may be compressed to "It would be nice of you to walk her home".

Line twenty of the exemplary template storage structure 600 indicates that attitudinal markers may be compressed. For example, the sentence "More importantly, the court upheld the conviction" may be compressed to "The court upheld the conviction" without disturbing the substantial meaning of the sentence or grammatical readability.

FIG. 13 shows a second exemplary template storage structure 601 for storing additional templates for matching and compressing parts of speech according to one of the various embodiments of this invention. Line 1 of the exemplary template storage structure 601 indicates that conjunctions may be compressed. For example, the phrase "It could be argued that the back injury contributed very significantly to the patients death, and, that there was a realization of the risk involved" could be compressed to "It could be argued that the back injury contributed very significantly to the patients death, that there was a realization of the risks involved".

Line two of the exemplary template storage structure 601 indicates that logical connectives may be compressed. The sentence "Therefore the car must have been on the road last night" may be compressed to "The car must have been on the road last night". Line four of the exemplary template storage structure 601 indicates that specificity markers may be compressed. For example, the sentence "In general, the roads are well lit at night" may be compressed to "The roads are well lit at night" without substantially disturbing the meaning or grammatical readability of the sentence.

Line five of the exemplary template storage structure 601 shows that First Person Assessment Statements may be compressed. For example, the sentence "In my opinion, there is insufficient information to make a decision" may be compressed to "There is insufficient information to make a decision". Line six of the exemplary template storage structure 601 indicates that temporal indicators may be compressed. For example, the sentence "In the past the storms were not as severe" may be compressed to "The storms were not as severe".

Line eleven of the exemplary template storage structure 601 indicates that sentences containing floating quantifiers may be compressed. For example, the sentence "The girls all went to the park" may be compressed to "The girls went to the park" and the sentence "The boys each had an ice-cream cone" may be compressed to "The boys had an ice-cream cone".

Line sixteen of the exemplary template storage structure 601, indicates that explicitly marked asides may be compressed. For example, the sentence "Credit will be extended for three months (90 days)" may be compressed to "Credit will be extended for three months".

Lines nineteen, twenty and twenty one indicate that prepositional phrases of manner, location and time may be compressed. For example, the templates indicate that all consecutive prepositional/adverbial phrases of manner except the last can be compressed. Similarly, all consecutive prepositional/adverbial temporal phrases except the last can be compressed. In contrast, all prepositional/ adverbial phrases of location except the first can be compressed.

FIG. 14 shows a third exemplary template storage structure 602 for storing additional templates for matching and compressing parts of speech according to one of the various embodiments of this invention. Line 1 of the exemplary template storage structure 602 indicates that politeness markers may be compressed. For example, the entire phrase "Please." may be compressed without significantly affecting the meaning and grammatical readability of the remaining phrases or sentences.

In line 2 of the third exemplary template storage structure 602 the function_post_processing( ) indicates that the pattern is matched and compression occurs in a final step after all other processing has been completed. For example, "Thank you." is compressed after the other processing has been completed.

In line 3 of the third exemplary template storage structure 602, the template indicates that sentences such as "If you could be so kind as to write me a letter every week" may be compressed to "Write me a letter every week". The compressed sentence maintains both the meaning and grammatical readability of the original sentence.

In line 4 of the third exemplary template storage structure 602, the template indicates that any sentence of the form "If you would take out the garbage please" can be compressed to "Take out the garbage please". Similarly line 5 of the third exemplary template storage structure 602 indicates that sentences of the form "If you are able to, telephone the plumber and ask when she will be able to fix the sink" may be compressed to "Telephone the plumber and ask when she will be able to fix the sink".

In line 6 of the third exemplary template storage structure 602, the template indicates that any sentence of the form "Take out the garbage, if you would." can be compressed to "Take out the garbage". Similarly line 7 of the third exemplary template storage structure 602 indicates that sentences of the form "Iron the clothing from the suitcase if you would" may be compressed to "Iron the clothing from the suitcase". The sentences are compressed while preserving the meaning and grammatical readability.

The templates in the exemplary template storage structure 600–602 are merely illustrative of one exemplary embodiment according to this invention. It will be apparent that any method or technique of determining the informativity of parts of speech and compressing the parts of speech with low informativity may be used in the practice of this invention.

In the various exemplary embodiments outlined above, the system for generating analytic summaries 100 can be implemented using a programmed general purpose computer. However, the system for generating analytic summaries 100 can also be implemented using a special purpose computer, a programmed microprocessor or micro-controller and peripheral integrated circuit elements, an ASIC or other integrated circuit, a digital signal processor, a hard-wired electronic or logic circuit such as a discrete element circuit, a programmable logic device such as a PLD, PLA, FPGA or PAL, or the like. In general, any device, capable of implementing a finite state machine that is in turn capable of implementing the flowcharts shown in FIGS. 3 and 5A–5B can be used to implement the system for generating analytic summaries 100.

Each of the circuits 5–90 of the system for generating analytic summaries 100 outlined above can be implemented as portions of a suitably programmed general purpose computer. Alternatively, circuits 5–90 of the system for generating analytic summaries 100 outlined above can be implemented as physically distinct hardware circuits within an ASIC, or using a FPGA, a PDL, a PLA or a PAL, or using discrete logic elements or discrete circuit elements. The particular form each of the circuits 5–90 of the system for generating analytic summaries 100 outlined above will take is a design choice and will be obvious and predicable to those skilled in the art.

Moreover, the system for generating analytic summaries 100 and/or each of the various circuits discussed above can each be implemented as software routines, managers or objects executing on a programmed general purpose computer, a special purpose computer, a microprocessor or the like. In this case, the system for generating analytic summaries 100 and/or each of the various circuits discussed above can each be implemented as one or more routines embedded in the communications network, as a resource residing on a server, or the like. The system for generating analytic summaries 100 and the various circuits discussed above can also be implemented by physically incorporating the system for generating analytic summaries 100 into a software and/or hardware system, such as the hardware and software systems of a web server or a client device.

As shown in FIGS. 2 and 4, the memory 15 can be implemented using any appropriate combination of alterable, volatile or non-volatile memory or non-alterable, or fixed, memory. The alterable memory, whether volatile or non-volatile, can be implemented using any one or more of static or dynamic RAM, a floppy disk and disk drive, a write-able or rewrite-able optical disk and disk drive, a hard drive, flash memory or the like. Similarly, the non-alterable or fixed memory can be implemented using any one or more of ROM, PROM, EPROM, EEPROM, an optical ROM disk, such as a CD-ROM or DVD-ROM disk, and disk drive or the like.

The communication links 10 shown in FIGS. 1, 2 and 4 can each be any known or later developed device or system for connecting a communication device to the system for generating analytic summaries 100, including a direct cable connection, a connection over a wide area network or a local area network, a connection over an intranet, a connection over the Internet, or a connection over any other distributed processing network or system. In general, the communication links 110 can be any known or later developed connection system or structure usable to connect devices and facilitate communication Further, it should be appreciated that the communication links 110 can be wired or wireless links to a network. The network can be a local area network, a wide area network, an intranet, the Internet, or any other distributed processing and storage network.

While this invention has been described in conjunction with the exemplary embodiments outlines above, it is evident that many alternatives, modifications and variations will be apparent to those skilled in the art. Accordingly, the exemplary embodiments of the invention, as set forth above, are intended to be illustrative and not limiting. Various changes may be made without departing from the spirit and scope of the invention.

What is claimed is:

1. A system for generating text summaries of a content portion comprising at least one phrase, the system comprising:
   a parts of speech determining circuit that determines the part of speech of constituents of the at least one phrase;
   an informativity determining circuit that determines the informativity of the constituents of the at least one phrase based on how much the part of speech of a first constituent of the at least one phrase modifies the part of speech of a second constituent of the at least one phrase;
   an informativity compressing circuit that compresses the constituents of the at least one phrase based on the determined informativity, grammatical readability and a desired degree of compression.

2. The system of claim 1, wherein the informativity compressing circuit comprises at least one of a prepositional/adverbial temporal phrase compressing circuit, a prepositional/adverbial phrase of manner compressing circuit, a prepositional/adverbial phrase of location compressing circuit, a consecutive adjective compressing circuit, a consecutive adverb compressing circuit, an intensifying adverb compressing circuit, an enumerating adverb compressing circuit, a consecutive determiner compressing circuit and an expletive connective adverb compressing circuit.

3. The system of claim 2, further comprising a subordinate clause compressing circuit.

4. The system of claim 2, wherein the expletive connective adverb compressing circuit further comprises a verb adjustment circuit.

5. The system of claim 1, wherein at least one content portions are text summaries generated by an alternate text summary generating system.

6. The system of claim 1, wherein the parts of speech determining circuit comprises at least one of a shallow syntactic parser, a deep parser, a tagger and a lexicon.

7. The system of claim 1, wherein the informativity compressing circuit further compresses the constituents of the at least one phrase based on the determined informativity, a desired degree of compression and a text type of the content portion.

8. A method for generating text summaries of a content portion comprising at least one phrase, the method comprising the steps of:
   determining a desired degree of compression;
   determining parts of speech of the constituents of the at least one phrase;
   determining the informativity of the constituents of the at least one phrase based on how much the part of speech of a first constituent of the at least one phrase modifies the part of speech of a second constituent of the at least one phrase;

compressing the constituent of the at least one phrase based in the determined informativity, grammatical readability and the desired degree of compression.

9. The method of claim 8, wherein determining the informativity comprises determining at least one of a prepositional/adverbial temporal phrase, a prepositional/adverbial phrase of manner, a prepositional/adverbial phrase, a consecutive adjective, a consecutive adverb, an intensifying adverb, an enumerating adverb, a consecutive determiner and an expletive connective adverb.

10. The method of claim 9, further comprising compressing subordinate clauses.

11. The method of claim 9, wherein determining the expletive connective adverb further comprises adjusting verbs in the phrase.

12. The method of claim 8, wherein at least one content portion is a text summary generated by an alternative text summary generating system.

13. The system of claim 8, wherein determining the part of speech comprises shallow syntactic parsing, deep parsing and tagging.

14. The method of claim 8, further comprising compressing the constituent of the at least one phrase based on the determined informativity, the desired degree of compression and a text type of the content portion.

* * * * *